(12) United States Patent
Erbes et al.

(10) Patent No.: US 7,596,199 B2
(45) Date of Patent: Sep. 29, 2009

(54) METHOD AND DEVICE FOR STABILIZING A STEAM DRYER ASSEMBLY IN NUCLEAR REACTOR PRESSURE VESSEL

(75) Inventors: John Geddes Erbes, Mt. View, CA (US); David Bryan Drendel, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/325,651

(22) Filed: Jan. 4, 2006

(65) Prior Publication Data

US 2007/0153964 A1  Jul. 5, 2007

(51) Int. Cl.
*G21C 15/00* (2006.01)
(52) U.S. Cl. .................. 376/371; 376/370; 376/347
(58) Field of Classification Search ............. 376/371, 376/370, 347
See application file for complete search history.

(56) References Cited

U.S. PATENT DOCUMENTS

| | | | | |
|---|---|---|---|---|
| 2,277,572 A | * | 3/1942 | Weissinger | 310/246 |
| 2,983,161 A | * | 5/1961 | Watson | 74/577 R |
| 3,042,742 A | * | 7/1962 | Foster | 174/69 |
| 3,297,893 A | * | 1/1967 | Litz | 310/246 |
| 3,387,156 A | * | 6/1968 | Elow et al. | 310/247 |
| RE27,173 E | * | 9/1971 | Lass et al. | 176/66 |
| 3,625,819 A | * | 12/1971 | Sodergard | 376/371 |
| 3,793,142 A | * | 2/1974 | Gunnarsson | 376/293 |
| 3,831,925 A | * | 8/1974 | Nakamura et al. | 267/156 |
| 4,345,549 A | * | 8/1982 | Colmano | 122/34 |
| 4,377,019 A | * | 3/1983 | Takahashi | 16/307 |
| 4,912,733 A | | 3/1990 | Gluntz | |
| 5,085,826 A | * | 2/1992 | Oosterkamp | 376/371 |
| 5,133,433 A | * | 7/1992 | Oosawa | 188/290 |
| 5,283,809 A | | 2/1994 | Challberg et al. | |
| 5,321,731 A | * | 6/1994 | Oosterkamp | 376/371 |
| 5,630,574 A | * | 5/1997 | Itakura | 267/155 |
| 6,030,006 A | * | 2/2000 | Lin | 285/411 |
| 6,457,622 B2 | * | 10/2002 | Henning | 296/98 |
| 7,294,140 B2 | * | 11/2007 | Mosnier et al. | 606/206 |

* cited by examiner

*Primary Examiner*—Rick Palabrica
(74) *Attorney, Agent, or Firm*—Harness, Dickey & Pierce, PLC

(57) ABSTRACT

A device and method for stabilizing a dryer assembly in a reactor pressure vessel of a nuclear reactor including a spring assembly dimensioned and positioned within the reactor pressure vessel for applying a stabilizing force to the dryer assembly relative to the reactor pressure vessel.

16 Claims, 4 Drawing Sheets

METHOD AND DEVICE FOR STABILIZING A STEAM DRYER ASSEMBLY IN NUCLEAR REACTOR PRESSURE VESSEL

FIELD

The present disclosure relates to nuclear reactors and, more specifically, to devices and methods for stabilizing a dryer assembly in a nuclear reactor pressure vessel.

BACKGROUND

The statements in this section merely provide background information related to the present disclosure and may not constitute prior art.

A reactor pressure vessel (RPV) of a nuclear reactor such as a boiling water reactor (BWR) typically has a generally cylindrical shape and is closed at both ends, by a bottom head and a removable top head. A top guide typically is spaced above a core plate within the reactor pressure vessel. A core shroud, or shroud, typically surrounds the reactor core and is supported by a shroud support structure. The shroud has a generally cylindrical shape and surrounds and supports both the core plate and the top guide. There is a space or annulus located between the cylindrical reactor pressure vessel and the cylindrically-shaped shroud.

Heat is generated within the core and water circulated up through the core is at least partially converted to steam. Steam separators located over the top of the shroud separate the steam and the water. Residual water is removed from the steam by steam dryers located above the separator assembly. The de-watered steam exits the reactor pressure vessel through a steam outlet near the vessel top head.

Typically, a reactor pressure vessel includes a top head secured to the reactor pressure vessel with vessel closure bolts. A conventional steam dryer is positioned within the reactor pressure vessel for removing residual water entrained in steam exiting the steam separators. It is positioned by its dryer support skirt, which rests on four to six dryer support brackets attached to the vessel shell. During loss of coolant accident (LOCA) conditions, upward displacement of the steam dryer is also limited by a steam dryer hold down assembly. The steam dryer hold down assembly often includes a plurality of RPV steam dryer hold down brackets connected to the steam dryer via corresponding steam dryer lifting rod eyes attached to steam dryer lifting rods. A typical steam dryer hold down assembly for conventional BWR steam dryers includes four RPV steam dryer hold down brackets attached to the inside of the top head of the reactor pressure vessel. During reactor construction, the corresponding steam dryer lifting rod eyes are typically adjusted so that their upper surfaces have from about a one-half inch to one inch clearance to the bottom surface of the steam dryer hold down brackets to allow for differential thermal expansion between the reactor pressure vessel and the steam dryer lifting rod.

However, conventional BWR design steam dryers can exhibit vibratory motion during operation, which manifests itself as unusual wear or, in some cases, cracking on upper bearing surfaces of steam dryer support brackets which support the steam dryer within the reactor pressure vessel. The wear and cracking indicates that the dryer is rocking due to uneven contact with its support brackets. The current dryer hold down assembly is generally intended to function only during a steam line break accident (i.e., loss-of-coolant accident (LOCA)), where the dryer lifts completely off of its support brackets, which support dryer support ring of the steam dryer. Thus, the dryer hold down assembly is not effective as a stabilizing support to prevent the vibratory motion of the steam dryer during normal operation.

There is additional concern that operating reactor plants implementing up-rated power operations (power operations in excess of rated power output) may be more susceptible to steam dryer vibratory motion due to increased steam flow and pressure drop across the dryer. The steam dryer assembly and/or its support bracket may become worn or otherwise damaged during such vibratory motion. When this occurs, the steam dryer vibratory motion is further enhanced and the vibratory motion and damage increases with further reactor operation due to uneven positioning of the steam dryer and/or the hold down brackets.

Typically, the steam dryer assembly is inspected during routine refueling outage maintenance on the reactor. Where damage or uneven contact with the support brackets is observed, a steam dryer rocking test has been used to evaluate required corrective action. The amount and location of the non-uniformity at the interfaces which support the dryer and the dryer support ring between the respective mating steam dryer support brackets which are attached to the RPV upper shell is determined by test. The test is performed by inducing rocking of the dryer that can include inserting a shim in one support bracket location, and applying a tipping weight on the top of the dryer at one eccentrically positioned location, then the diagonally opposite location. The amount of tipping is measured using dial indicators that record the relative movement of the tops of the dryer lifting rods. This testing procedure is repeated with various shim and weight positions. As the measured values include effects of sagging due to dryer flexibility and non-uniform spacing of the support brackets, adjustment calculations are required to determine the amounts of wear or non-uniformity.

If the tests indicated wear or non-uniform seating of the dryer assembly to the support brackets, adjustment is typically made by grinding the bottom of one or more dryer support ring contact or bearing surfaces. Generally during the testing and grinding processes, no further reactor maintenance or correction can be performed within the reactor pressure vessel and the steam dryer cannot be removed until the testing is complete. As such, the testing and modification to the dryer assembly and support brackets is a critical path item during reactor maintenance and therefore increases the amount of time the reactor is off line.

SUMMARY

The inventors hereof have recognized that reducing or eliminating steam dryer vibrations and the resulting damage can increase the life of the steam dryer assembly, reduce the critical path duration required for dryer support measurements, and reduce reactor maintenance intervals. The inventors have succeeded at designing a device and method for stabilizing a dryer assembly within a reactor pressure vessel of a nuclear reactor. This can include retrofitting or modifying an existing nuclear reactor. By providing improved stabilization of the steam dryer, various benefits can include one or more of improved operations of a nuclear reactor assembly, reduced maintenance intervals, and reduced maintenance costs.

According to one aspect, a device for stabilizing a dryer assembly in a reactor pressure vessel of a nuclear reactor includes a spring dimensioned and positioned within the reactor pressure vessel to apply a stabilizing force to the dryer assembly relative to the reactor pressure vessel.

According to another aspect, a device for stabilizing a dryer assembly in a reactor pressure vessel of a nuclear reactor, includes a reaction arm coupled to a hold down bracket of a top head of the reactor pressure vessel, and a spring coupled to the reaction arm and positioned to preload the dryer assembly downward against a steam dryer support bracket of the reactor pressure vessel.

According to another aspect, in a reactor pressure vessel of a nuclear reactor, a stabilizing means applies a stabilizing force to a dryer assembly relative to the reactor pressure vessel.

According to yet another aspect, a method for stabilizing a dryer assembly in a reactor pressure vessel of a nuclear reactor includes preloading the dryer assembly with a stabilizing force within the reactor pressure vessel.

According to still another aspect of the invention, a method of modifying a reactor pressure vessel of a nuclear reactor to stabilize a dryer assembly during operation of the nuclear reactor includes positioning a spring between the reactor pressure vessel and the dryer assembly to provide a stabilizing force to the dryer assembly within the reactor pressure vessel.

According to another aspect, a method of modifying a reactor pressure vessel of a nuclear reactor to stabilize a dryer assembly during operation of the nuclear reactor includes positioning a spring between the reactor pressure vessel and the dryer assembly to provide added stiffness to a support of the dryer assembly, and stabilizing the dryer against upward motion within the reactor pressure vessel.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

According to some embodiments of the invention, in a reactor pressure vessel (RPV) of a nuclear reactor, a stabilizing means such as a stabilizing assembly is configured for applying a stabilizing force to a dryer assembly relative to the reactor pressure vessel.

Figure 1:
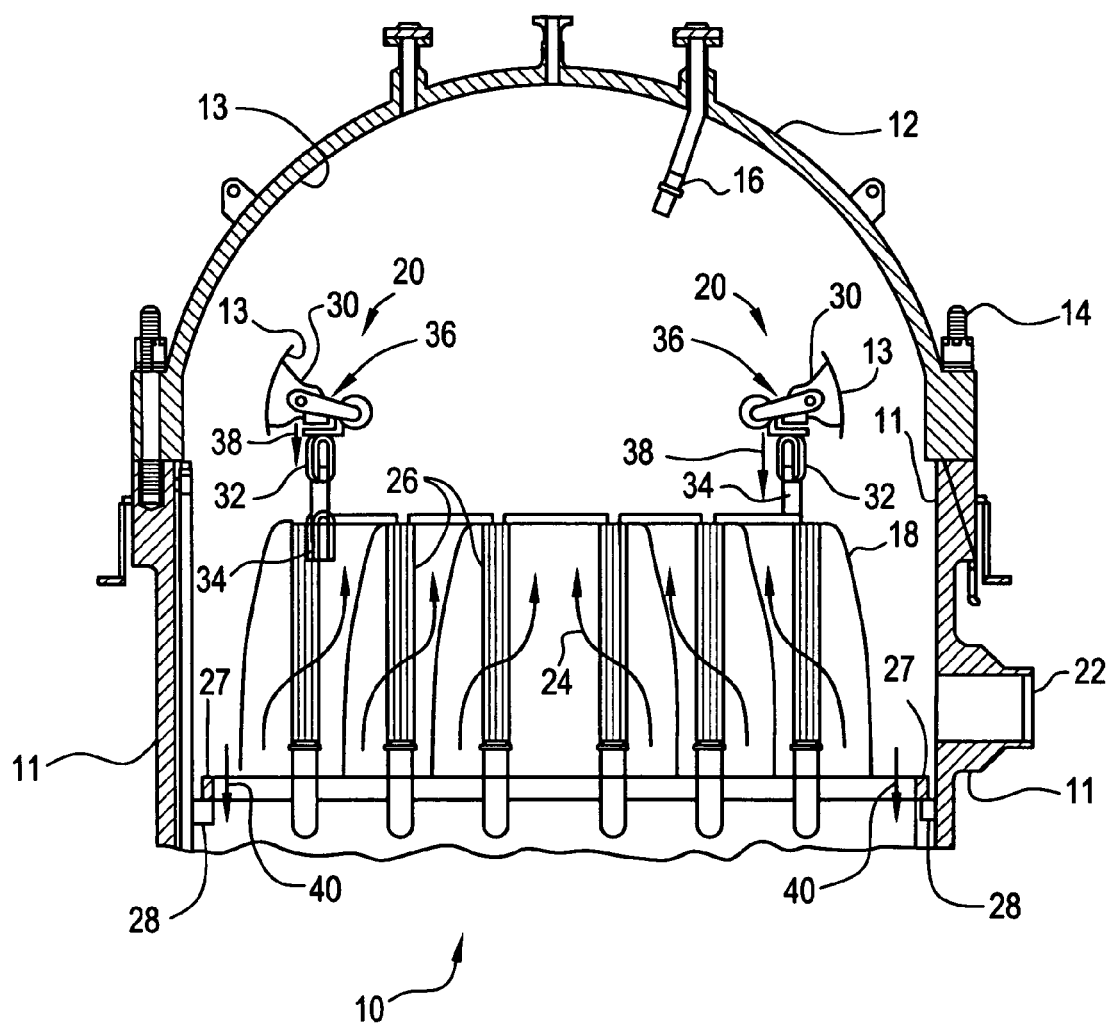
FIG. 1 illustrates an upper portion of a reactor pressure vessel (RPV) of a boiling water reactor including the steam dryer within the RPV according to one exemplary embodiment of the invention.

Referring to FIG. 1, an upper portion of a reactor pressure vessel (RPV) for a boiling water reactor includes a steam dryer stabilizing device and method according to one exemplary embodiment of the invention. A reactor pressure vessel (RPV) 10 includes a top head 12 having an inner surface 13 secured to an RPV upper shell 11 via main closure head bolts 14. Some of the components within the RPV 10 of the conventional BWR have been removed for clarity. Although FIG. 1 illustrates a head spray nozzle 16 penetrating the top head 12, a conventional dryer assembly 18 for removing residual water entrained in steam exiting the steam separators (not shown), a steam dryer hold down assembly 20, and the steam outlet nozzle 22. The spray nozzle 16 carries the de-watered steam exiting the dryer assembly 18 out of the RPV 10 to power turbine generators and associated downstream electrical distribution systems (not shown). Residual water or condensate removed from a steam-water mix 24 exiting the steam dryers is returned to the reactor via drain channels 26 in the dryer assembly 18.

The steam dryer assembly 18 includes a dryer support ring 27 for mounting the steam dryer assembly 18 on a dryer support bracket 28 within the RPV upper shell 11. The steam dryer hold down assembly 20 can include a plurality of RPV steam dryer hold down brackets 30 connected to the dryer assembly 18 via a corresponding steam dryer lifting rod eye 32 to steam dryer lifting rod 34. A typical steam dryer hold down assembly 20 for dryer assembly 18 includes four RPV steam dryer hold down brackets 30 attached to the inner surface 13 of the top head 12 of the RPV 10, corresponding to the same number of lifting rods 34 used to install the dryer assembly 18.

As shown in the exemplary embodiment of FIG. 1, one or more of the steam dryer hold down assemblies 30 includes a stabilizing assembly 36 mounted to the dryer hold down assembly 20. The stabilizing assembly 36 is adapted and positioned between the dryer hold down bracket 30 and the lifting rod 34 and/or lifting rod eye 32 to provide a stabilizing force 38 to the dryer assembly 18 (as illustrated by arrows 38). The stabilizing force 38 applied by the stabilizing assembly 36 to the lifting rod eye 32 creates a stabilizing force on the dryer assembly 18. The stabilizing force 38 also acts to stabilize the dryer support ring 27 against the dryer support bracket 28. This stabilizing force 38 between the dryer assembly 18 and the dryer support bracket 28 is illustrated in FIG. 1 as a stabilizing force 40. In this exemplary embodiment, the stabilizing assembly 36 is coupled to the dryer hold down assembly 20. However, it should be understood that the stabilizing assembly 36 could be coupled to other structures or positioned in other relationships within the RPV and in relationship to the dryer assembly 18 in one or more other embodiments.

In some embodiments, the stabilizing forces 38 and 40 are desired to be a substantial downward force that is applied even during thermal expansion. The stabilizing forces 38 and 40 are often desired to prevent any rocking of the dryer assembly 18 on the dryer support brackets 28. In one embodiment, the preferred spring force is approximately ¼ to ½ of the weight of the dryer, or about 20,000 pounds per lifting rod 34. While sufficient to effectively restrain motion of the dryer assembly 18, this preferred spring force is not significant with respect to the combined weight of the top head 12 and closure head bolt 14 preload available to react the spring force.

In some embodiments, the stabilizing force 38 and stabilizing force 40 can be a displacement limiting force on one or more stabilizing assemblies 36. For example, in some embodiments the stabilizing assembly 36 may not apply a downward force when the dryer assembly 18 is in a resting or normal position. In such, the stabilizing assembly 36 is configured to apply the stabilizing force 38 upon an upward movement of the dryer assembly 18. For example, this can include the upward movement of the dryer support ring 27 from the dryer support bracket 28. In this case, it is the added stiffness of the stabilizing assembly 36 that inhibits undesirable motion of the steam dryer 18.

In other embodiments, all installed stabilizing assemblies 36 are configured to apply the stabilizing force 38 during normal operations following assembly of the RPV 10. For example, this can be a continuous downward force. In such embodiments, the stabilizing assembly 36 can be preloaded as a result of placement of the top head 12 and dryer hold down assemblies 20. For example, in some embodiments the stabilizing assembly 36 can include one or more springs (not shown) that are compressed between the top head 12 and the dryer assembly 18 when the top head 12 is placed onto the RPV 10 after each refueling. Such a compressed spring can provide the stabilizing force 38 to the dryer lifting rod eye 32 continuously downward thereby applying a continuously downward stabilizing force 40 between the dryer support ring 27 of the dryer assembly 18 and the dryer support bracket 28.

Figure 2:
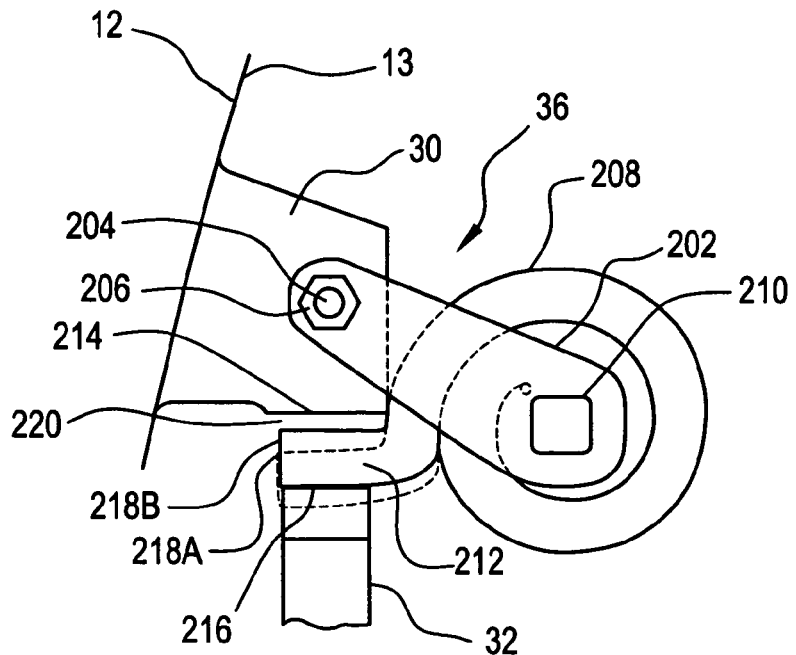
FIG. 2 is a side perspective view of a stabilizing device for a steam dryer within the RPV according to one exemplary embodiment of the invention.
Figure 3:
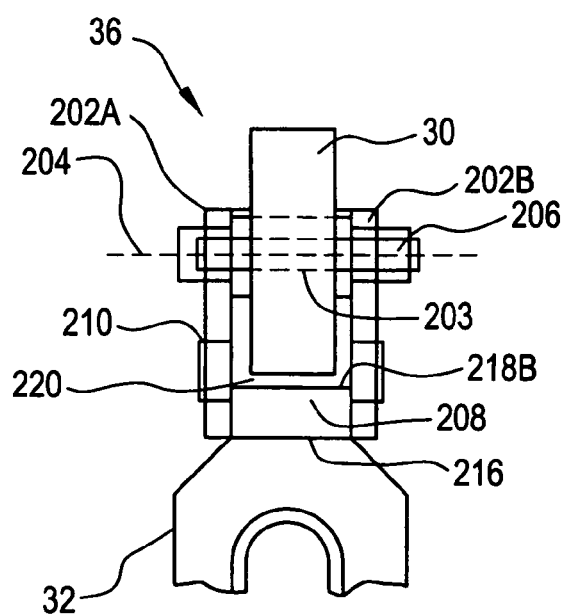
FIG. 3 is a front perspective view of the stabilizing device according to the exemplary embodiment as shown in FIG. 2.

FIGS. 2 and 3 provide two illustrations (FIG. 2 a side view and FIG. 3 a front view) of a dryer stabilizing assembly 36 according to one exemplary embodiment. As illustrated in FIG. 2, a dryer stabilizing assembly 36 can be coupled to the top head 12 via a dryer hold down bracket 30. One or more reaction arms 202 are rotatably coupled to the dryer hold down bracket 30 about a pivoting point 204. The reaction arms 202 are defined by and coupled to the dryer hold down bracket 30 by fastener 206 positioned through a mounting hole 203 as shown in FIG. 3. The fastener 206 can be any type of suitable fastener and can include, by way of example, a bolt and nut assembly. As shown in FIG. 3, in one embodiment the mounting hole 203 receives a bolt fastener 206. A first reaction arm 202A is positioned on a first side of the dryer hold down bracket 30 and a second reaction arm 202B is positioned on a second side of the dryer hold down bracket 30. A fastener or bolt is positioned to couple the two reaction arms 202A and 202B to the dryer hold down bracket 30.

A spring 208 is coupled to the reaction arm 202 via a coupling fastener 210. The spring 208 can be any type of spring or elastic device or assembly and is shown in FIG. 2 as a spiral spring, only by way of example. The spring 208 can be made of any high strength corrosion resistance elastic material suitable for use as a spring within the reactor. For example, the spring 208 could be made of a Nickel-Chromium-Iron alloy such as the X-750 alloy. The coupling fastener 210 can be any torque transmitting fastener and can include an integral square lug, as shown in FIGS. 2 and 3. When the spring 208 is a spiral spring, the coupling fastener 210 can be fixedly coupled to a center portion of the spring 208 such that the center of the spring does not rotate about the coupling fastener 210. Use of the high strength alloy in the spiral spring form that is nested against the hold down bracket 30 can provide a compact envelope size to minimize blockage of the flow path of steam from the dryer assembly 18 existing the RPV 10.

The spring 208 can include a protruding end 212 that is positioned between a lower surface 214 of the dryer hold down bracket 30 and a top surface 216 of the dryer lifting rod eye 32. The spring 208 is illustrated as having a free state 218A wherein the protruding end 212 is at a lower position and an installed position 218B. In the installed position 218B, a lower surface of the protruding end 212 is compressed against the top surface 216 and the spring 208 is elastically unwound to position 218B. In the installed position 218B, a stabilizing gap 220 is defined between the protruding end 212 and the lower surface 214 of the dryer hold down bracket 30. The stabilizing gap 220 can be various distances such as to enable the spring 208 and dryer lifting rod eye 32 to flex upward while still enabling the stabilizing assembly 36 to provide a downward stabilizing force 38. The gap size can be predetermined, consistent with the spring sizing, and to accommodate differential expansion between the dryer assembly 18 and the top head 12 during transients such as reactor startup and shutdown. In some embodiments, the stabilizing gap 220 can be about one-half an inch.

In some embodiments, the reaction arm 202 can include a first reaction arm portion and a second reaction arm portion positioned generally in parallel with the first reaction arm portion to form the reaction arm 202. The first reaction arm portion can be positioned on a first side of the dryer hold down bracket 30 and a first side of the spring 208. The second reaction arm portion can be positioned on a second side of the dryer hold down bracket 30 and a second side of the spring 208. In this manner, the spring 208 and the dryer hold down bracket 30 are held between the two portions of the reaction arm 202 the fastener 206 and the coupling fastener 210 to form, at least in part, the stabilizing assembly 36.

In some exemplary embodiments, the stabilizing assembly 36 applies a downward force (which can be a continuous downward force) between the top head 12 and the dryer lifting rod eye 32 thereby applying the stabilizing force 38 to the dryer assembly 18. The spring 208 can be placed in free state 218A upon installation of the stabilizing assembly 36 and coupling of the reaction arms 202A and 202B to the dryer hold down bracket 30 and to the spring 208. The stabilizing assembly 36 can be configured so the spring 208 is supported in correct alignment for engagement with the dryer lifting rod eye 32 by contact between the spring 208 and the side of the hold down bracket 30. The spring 208 is compressed in the installed position 218B upon lowering of the top head 12 onto the RPV 10.

In some embodiments, a stabilizing assembly 36 can be installed on a new RPV 10 during construction and installation. In other embodiments, the stabilizing assembly 36 can be installed as a modification to an existing reactor and reactor pressure vessel (RPV).

For example, in one embodiment, a method of modifying a reactor pressure vessel (RPV) of a nuclear reactor to stabilize a dryer assembly during operation of the nuclear reactor includes positioning a spring between the reactor pressure vessel and the dryer assembly to provide a stabilizing force to the dryer assembly within the reactor pressure vessel.

In some embodiments, the method can also include attaching the spring 208 to a hold down bracket 30 of a top head 12 of the reactor pressure vessel 10 and placing the top head 12 onto the reactor pressure vessel 10. In this manner, the stabilizing force 38 can be either a continuous downward stabilizing force against a steam dryer hold down bracket 30 or a displacement limiting force that inhibits the upward movement of the dryer assembly 18. The latter embodiment provides added stiffness to the support of the dryer assembly 18, thereby stabilizing the dryer assembly 18 against upward motion within the RPV 10.

In some embodiments, the method includes placing a portion of the spring between a portion of a hold down bracket 30 and a dryer lifting rod 34. In this manner, the spring 208 can be deflected by contacting the dryer lifting rod 34 upon placement a top head 12 onto the reactor pressure vessel 10 and thereby create a downward stabilizing force 38 against the dryer lifting rod and therefore the dryer assembly 18.

Figure 4:
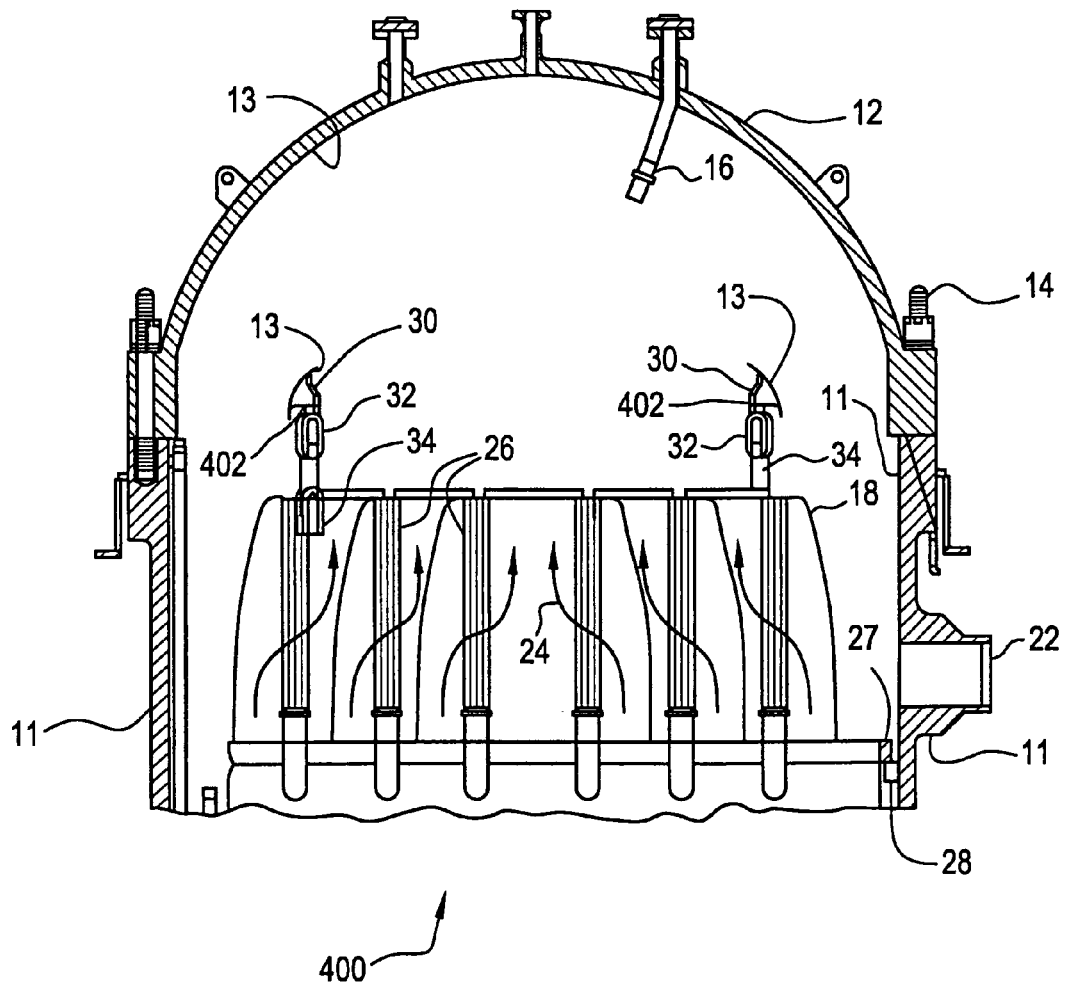
FIG. 4 is illustrates a traditional upper portion of a reactor pressure vessel (RPV) of a boiling water reactor including the steam dryer within the RPV.

By way of example, FIG. 4 illustrates a conventional reactor pressure vessel 400 capable of modification with the current method of stabilizing a dryer assembly 18. This RPV 400 is the unmodified form of the above RPV 10. As with conventional RPVs 10, the dryer assembly 18 is mounted via the dryer support ring 27 to the dryer support bracket 28 without a stabilizing force, either during normal operation or during an upward movement of the dryer from the dryer support bracket 28. In the conventional RPV 400, the dryer assembly 18 has considerable weight that is supported at the bottom of the dryer assembly 18 by the seating of corresponding dryer support ring 27 on a plurality of dryer support brackets 28 attached to the RPV upper shell 11. Four steam dryer lifting rods 34 are used as an accident condition hold down device for the dryer assembly 18. Upward displacement of the steam dryer lifting rods 34 is limited by the four hold down brackets 30 attached to the inside of the top head 12 of the RPV 400. The dryer hold down brackets 30 typically have from about a one-half inch to one inch clearance or gap 402 from the lifting rod eyes 32. The clearance gap 402 typically provides for differential thermal expansion between the RPV 10 and the steam dryer lifting rod 34 and is generally formed during construction by adjusting each steam dryer lifting rod eye 32 so that its upper surface forms the desired clearance gap 402. As such, the dryer hold down brackets 30 do not restrain the operational motions that occur due to dryer assembly 18 rocking on dryer support brackets 28.

Figure 5:
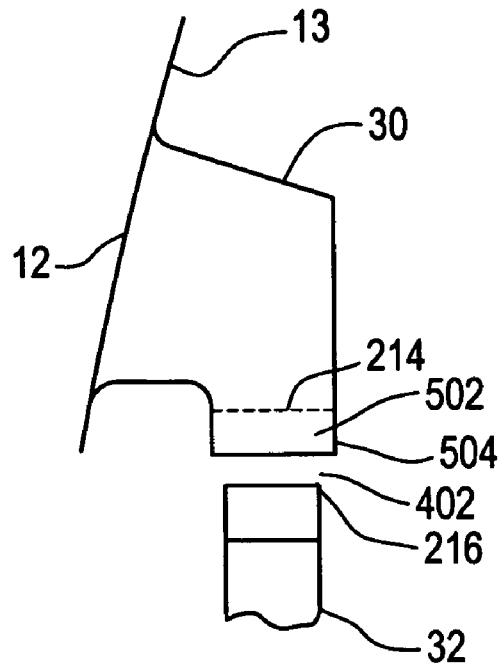
FIG. 5 is a side view of a traditional steam dryer hold down bracket and lifting rod eye prior to modification according to one embodiment of the invention.

However, the RPV 400 can be modified during a reactor maintenance procedure as described above and as further illustrated in FIGS. 5 and 6. FIG. 5 illustrates a conventional reactor pressure vessel 400 dryer hold down bracket 30 in an installed position relative to the dryer lifting rod eye 32. As shown, the dryer hold down bracket 30 includes a lower portion 502 with a lower surface 504 that extends downward to form the gap 402 with the top surface 216 of dryer lifting rod eye 32. In order to modify the dryer hold down bracket 30 to accept the stabilizing assembly 36, the lower portion 502 is shortened to the lower surface 214. The amount of removed portion 602 can be determined by lifting the top head 12 and replacing it one or more times with measurement devices or tools in place for determining the necessary amount of required removed portion 602. Alternatively, amount of required removed portion 602 can be determined by measuring the height of each dryer lifting rod eye 32 above a vessel closure seal surface (not shown), and the height of each hold down bracket 30 above the mating top head seal surface (not shown). This can be performed without replacing the top head 12.

Figure 6:
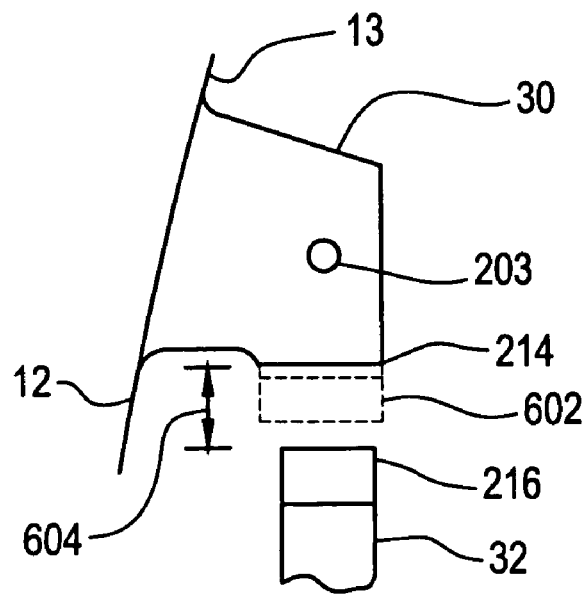
FIG. 6 is a side view of a steam dryer hold down bracket and lifting rod eye illustrating a modification of the bold down bracket according to one embodiment of the invention.

As shown in FIG. 6, a removed portion 602 of the lower portion 502 is removed from the dryer hold down bracket 30 to form a larger gap 604. The removed portion 602 can be removed by any conventional cutting methods, including grinding, sawing, or milling. The new larger gap 604 is dimensioned to accept the protruding end 212 of the spring 208 (as shown in FIG. 2 by way of example) between the dryer hold down bracket 30 and the dryer lifting rod eye 32 and forming the desired stabilizing gap 220.

Additionally, the mounting hole 203 can be drilled or otherwise machined into the dryer hold down bracket 30 as illustrated in FIG. 6. The mounting hole 203 is configured to receive the fastener 206 and to provide the pivot point 204 for one or more reaction arms 202.

Following modification of the dryer hold down bracket 30 as shown in FIG. 6, the stabilizing assembly shown and described above with regard to FIGS. 2 and 3 can be coupled to the dryer hold down bracket 30 and the top head 12 placed back on top of RPV 400. In this manner, the stabilizing assembly 36 as shown in FIG. 1 is implemented.

It should be understood that the illustrated modifications can vary depending on the structure and positioning and design of the stabilizing assembly. This modification method is only directed to one of various designs of reactor pressure vessels, dryer assemblies, and stabilizing assemblies. Other such implementations, consistent with these teachings, are also considered within the scope of the present disclosure.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A device for stabilizing a dryer assembly in a reactor pressure vessel of a nuclear reactor, comprising:
   a reaction arm having a first end shaped and positioned to couple to a hold down bracket of a top head of the reactor pressure vessel, the reaction arm being rotatable about the first end; and
   a spring coupled to a second end of the reaction arm, the spring including an end configured to transfer a stabilizing force to a steam dryer support bracket of the dryer assembly relative to the reactor pressure vessel, the first end of the reaction arm, the second end of the reaction arm, and the end of the spring being substantially coplanar in a plane substantially perpendicular to an axis of rotation of the first end of the reaction arm.

2. The device of claim 1 wherein the spring is preloaded with a force of approximately 20,000 pounds for providing a continuous stabilizing preload to the dryer assembly during normal operations.

3. The device of claim 2 wherein the spring is preloaded for providing a downward preloaded force to the dryer assembly and against a steam dryer support bracket of the dryer assembly upon placement of the top head onto the reactor pressure vessel.

4. The device of claim 1 wherein the spring is positioned between the dryer assembly and a top head of the reactor pressure vessel and is configured for applying a downward force to the dryer assembly only during upward vertical movement of the dryer assembly.

5. The device of claim 1 wherein the spring is configured to be positioned between a hold down bracket of a top head of the reactor pressure vessel and a lifting rod of the dryer assembly and provides a downward stabilizing force to the lifting rod from the hold down bracket, and further configured to provide a stabilizing gap dimensioned to enable the spring to flex upwards into the stabilizing gap.

6. The device of claim 1, wherein the reaction arm includes a first portion configured to couple to the hold down bracket and a second portion configured to couple to the spring, the reaction arm configured for positioning the spring for providing a downward stabilizing force relative to the hold down bracket.

7. A device for stabilizing a dryer assembly in a reactor pressure vessel of a nuclear reactor, comprising:
 a reaction arm having a first end configured to couple to and rotate about a hold down bracket of a top head of the reactor pressure vessel, the reaction arm being rotatable about the first end; and
 a spring coupled to a second end of the reaction arm and positioned for preloading the dryer assembly with a force of approximately 20,000 pounds downward against a steam dryer support bracket of the reactor pressure vessel.

8. The device of claim 7 wherein the spring is a spiral spring.

9. The device of claim 7, wherein the spring is configured to be positioned within a gap between the dryer assembly and the hold down bracket when coupled to the second end of the reaction arm, the spring dimensioned to provide the gap for enabling the spring to flex upward and the dryer assembly to flex upward against the preloaded spring.

10. The device of claim 7 wherein the spring is configured for providing a downward force to the dryer assembly upon placement of the top head onto the reactor pressure vessel.

11. The device of claim 7 wherein the spring is configured to be positioned against a lifting rod of the dryer assembly and preloading the lifting rod downward.

12. The device of claim 11 wherein the lifting rod includes a lifting rod eye positioned about a top end of the lifting rod, and wherein the spring is positioned against the lifting rod eye and preloads the lifting rod eye downward.

13. The device of claim 7 wherein the reaction arm is configured to couple to the hold down bracket with a first fastener and to the spring with a second fastener.

14. The device of claim 13 wherein the first fastener is a bolt and the second fastener is a torque reaction lug.

15. The device of claim 14 wherein the reaction arm includes a first reaction arm portion and a second reaction arm portion positioned generally in parallel with the first reaction arm portion to form the reaction arm, the first reaction arm portion configured to be positioned on a first side of the hold down bracket and a first side of the spring and the second reaction arm portion configured to be positioned on a second side of the hold down bracket and a second side of the spring.

16. The device of claim 7, wherein the reactor pressure vessel includes four reaction arms, each reaction arm including support bracket coupled to one of four hold down brackets within the top head of a reactor pressure vessel and each support bracket being coupled to a one of four spiral springs.

* * * * *